(12) United States Patent
Sreekantham

(10) Patent No.: US 8,788,099 B2
(45) Date of Patent: Jul. 22, 2014

(54) POSITION-BASED STEP CONTROL ALGORITHM FOR A MOTION CONTROL SYSTEM

(75) Inventor: Kiran Sreekantham, Austin, TX (US)

(73) Assignee: National Instruments Corporation, Austin, TX (US)

( * ) Notice: Subject to any disclaimer, the term of this patent is extended or adjusted under 35 U.S.C. 154(b) by 363 days.

(21) Appl. No.: 13/194,222

(22) Filed: Jul. 29, 2011

(65) Prior Publication Data

US 2013/0030572 A1 Jan. 31, 2013

(51) Int. Cl.
*G05B 15/02* (2006.01)
(52) U.S. Cl.
USPC ............................................ 700/275; 341/11
(58) Field of Classification Search
CPC ................................................. G05B 19/34024
USPC .................................. 700/275, 89, 56; 341/11
See application file for complete search history.

(56) References Cited

U.S. PATENT DOCUMENTS

| | | |
|---|---|---|
| 5,425,005 A | 6/1995 | Urabe et al. |
| 5,513,096 A | 4/1996 | Casler, Jr. et al. |
| 5,932,987 A | 8/1999 | McLoughlin |
| 6,035,265 A | 3/2000 | Dister et al. |
| 6,194,863 B1 | 2/2001 | Mainberger |
| 6,560,572 B1 | 5/2003 | Balaram et al. |
| 6,590,366 B1 | 7/2003 | Browning et al. |
| 6,823,221 B2 | 11/2004 | Peck et al. |
| 7,194,321 B2 | 3/2007 | Sun et al. |
| 8,050,800 B2 | 11/2011 | Miller et al. |

OTHER PUBLICATIONS

Ranade, Pramod "Linear motor control without the math", EEtimes Apr. 2009 pp. 1-8.*

* cited by examiner

*Primary Examiner* — Mohammad Ali
*Assistant Examiner* — Emilio J Saavedra
(74) *Attorney, Agent, or Firm* — Meyertons, Hood, Kivlin, Kowert & Goetzel, P.C.; Jeffrey C. Hood

(57) ABSTRACT

A motion control interface device includes an FPGA configured to implement a step generation algorithm that generates step control signals for a motion device. The signals are not determined based directly on time, but instead are determined from the position of the motion device. More particularly, the step generation algorithm operates to keep track of a position fraction based on the position. The position fraction is incremented (or decremented) at each clock tick of the FPGA. The algorithm generates rising edge signals when the position fraction crosses a particular threshold value, referred to as the rising edge threshold value. Similarly, the algorithm signals direction changes when the position fraction crosses a threshold referred to as the direction change threshold value.

18 Claims, 9 Drawing Sheets

POSITION-BASED STEP CONTROL ALGORITHM FOR A MOTION CONTROL SYSTEM

FIELD OF THE INVENTION

The present invention relates generally to motion control. More particularly, the invention relates to a system and method for generating step pulses to control a motion device to move an object.

DESCRIPTION OF THE RELATED ART

Motion control is used in various applications to precisely control the movement of a device. A motion system typically comprises five major components: 1) the moving mechanical device; 2) the motor (servo or stepper motor) with feedback and motion I/O; 3) the motor drive unit; 4) the intelligent controller; and 5) the programming/interface software. Scientists and engineers typically use servo and stepper motors for position and velocity control in a variety of electro-mechanical configurations.

In particular, stepper motor systems typically include a controller, a power drive, and a stepper motor. The controller is able to generate step pulses to command the drive to move the motor (and therefore the object that is desired to be moved) an incremental movement often called a "step." The drive accepts these pulses and generates the high currents and voltages necessary to move the motor. The frequency of the step pulses controls velocity, the rate of change controls acceleration, and the total number of pulses controls the position.

In many applications it is desirable to generate the step pulses so that the motion occurs smoothly, e.g., without abrupt changes in velocity or acceleration. Some previous motion control systems have relied on time-based control algorithms to smooth the step pulses, e.g., algorithms that function to determine a desired time to generate each step pulse. While these algorithms may indeed achieve smooth motion, they often come at a high computational cost.

SUMMARY OF THE INVENTION

One embodiment of the present invention includes a motion control system and method for generating step pulses to achieve smooth operation of a motion device such as a stepper motor. The motion control system may include a motion control interface device coupled to the motion device, where the motion control interface device sends control signals to the motion device to cause the motion device to perform each step. More particularly, the motion control interface device may include an FPGA (Field-programmable Gate Array) device, where the FPGA device is configured to implement a step generation algorithm that generates the step control signals. In some embodiments the step generation algorithm described herein can be performed entirely on the FPGA device of the motion control interface device so that no processor is needed to generate the step pulses. The step pulse generation algorithm may be performed during each clock tick of the FPGA, and may be computationally simple enough to be completed during each clock tick. The algorithm may work by keeping track of the position of the motion device. As the position crosses certain threshold boundaries, the algorithm causes the motion control interface device to send control signals to the motion device.

To generate the steps the motion control interface device sends True and False signals over a control line which controls the rising edge and falling edge of each step. Setting the signal to True causes the rising edge of a step to begin, and setting it back to False causes the falling edge of the step to occur. In addition to the control line that controls the rising and falling edges of the steps, the motion control interface device also uses another control line to control the direction of the motion device. The motion device may move in the forward direction when the direction control line is True, and may change direction to move in the reverse direction when the direction control line becomes False. Thus, toggling the direction line from True to False or vice verse causes the motion device to change directions.

The step generation algorithm determines when the signals indicating the rising/falling edges of the steps and when the signals indicating direction changes should be sent to the motion device. However, the signals are not determined based directly on time, but instead are determined from the position of the motion device. More particularly, the algorithm operates to keep track of a position fraction based on the position. The position fraction is incremented (or decremented) at each clock tick of the FPGA. The algorithm generates rising edge signals when the position fraction crosses a particular threshold value, referred to herein as the rising edge threshold value. Similarly, the algorithm signals direction changes when the position fraction crosses a threshold referred to herein as the direction change threshold value.

BRIEF DESCRIPTION OF THE DRAWINGS

A better understanding of the present invention can be obtained when the following detailed description of the preferred embodiment is considered in conjunction with the following drawings, in which.

Figure 1:
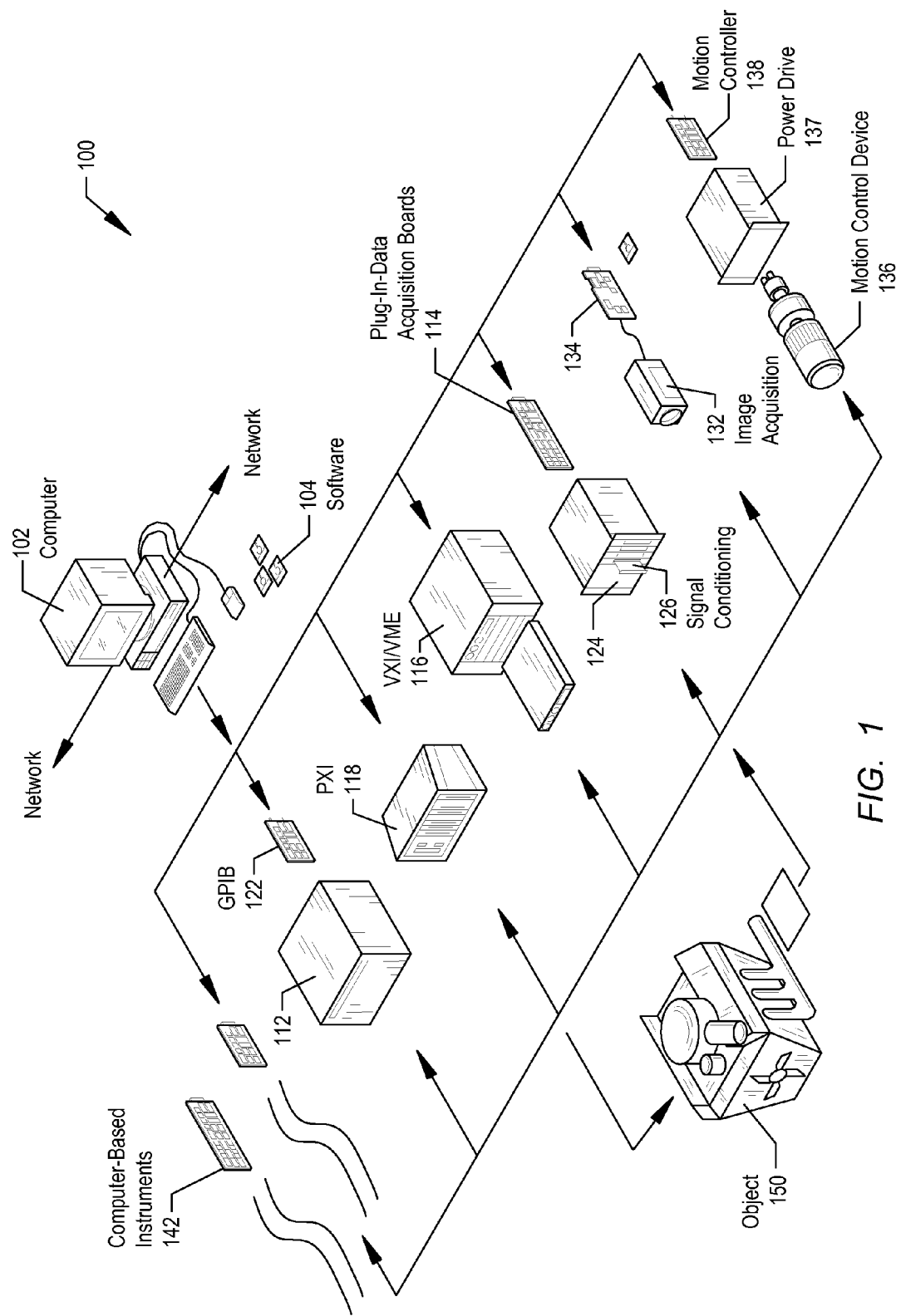
FIG. 1 illustrates an example of a system for motion control and measurement including an object being scanned according to one embodiment.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

FIG. 1—Exemplary Motion Control/Measurement System

FIG. 1 illustrates an example motion control system 100 that includes various options for measurement or data acquisition. The motion control system may be configured to move object 150 and/or scan object 150 while object 150 is being moved. FIG. 1 is exemplary only, and the present invention may be used in any of various systems, as desired.

The system 100 includes a host computer 102. The host computer 102 comprises a CPU, a display screen, memory, and one or more input devices such as a mouse or keyboard as shown. The computer 102 couples to a motion control system including a motion device 136 and a motion control interface card 138. As used herein, the term "motion device" or "motion control device" is intended to include stepper motors, servo motors, and other motion control devices or systems that are operable to receive a motion control signal and move responsive to the received signal. Typically an object is placed on or otherwise coupled to the motion device, and the motion device operates to move the object. The motion device 136 is coupled to the computer 102 through the motion control interface card 138. In some embodiments the motion control interface card 138 may be plugged into an I/O slot in the computer 102, such as a PCI bus slot provided by the computer 102. However, the card 138 is shown external to computer 102 for illustrative purposes. The card 138 may also be implemented as an external device coupled to the computer 102. In one embodiment, a power drive or wiring interface 137 may convert control signals from the motion control interface card 138 into current and voltage power signals for the motion device 136.

In some embodiments the motion control interface card 138 may include an FPGA (Field-programmable Gate Array) which is configured to perform an algorithm to control the generation of steps to control the motion device 136. Various embodiments of the algorithm are described in detail below. As used herein, the term FPGA includes the full breadth of its ordinary meaning and includes any of various hardware devices comprising multiple programmable function blocks connected via a programmable interconnect.

The computer system 102 may also couple to one or more measurement devices which may be used, for example, to acquire measurements of an object 150 which is moved by the motion control device 136. The one or more measurement devices may include a GPIB instrument 112 and associated GPIB interface card 122, a data acquisition (DAQ) board 114 and associated signal conditioning circuitry 124, a VXI/VME instrument 116, a PXI instrument 118, a video device 132 and associated image acquisition card 134, and/or one or more computer based instrument cards 142, among other types of measurement or data acquisition devices.

The GPIB instrument 112 is coupled to the computer 102 via a GPIB interface card 122 provided by the computer 102. In a similar manner, the video device 132 is coupled to the computer 102 via the image acquisition card 134. The data acquisition board 114 is coupled to the computer 102, and optionally interfaces through signal conditioning circuitry 124 to the UUT. The signal conditioning circuitry 124 preferably comprises a SCXI (Signal Conditioning eXtensions for Instrumentation) chassis comprising one or more SCXI modules 126.

The GPIB card 122, the image acquisition card 134, and the DAQ card 114 are typically plugged in to an I/O slot in the computer 102, such as a PCI bus slot provided by the computer 102. However, these cards 122, 134 and 114 are shown external to computer 102 for illustrative purposes. The cards 122, 134 and 114 may also be implemented as external devices coupled to the computer 102, such as through a serial bus.

The VXI/VME chassis or instrument 116 is coupled to the computer 102 via a serial bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102.

Figure 2:
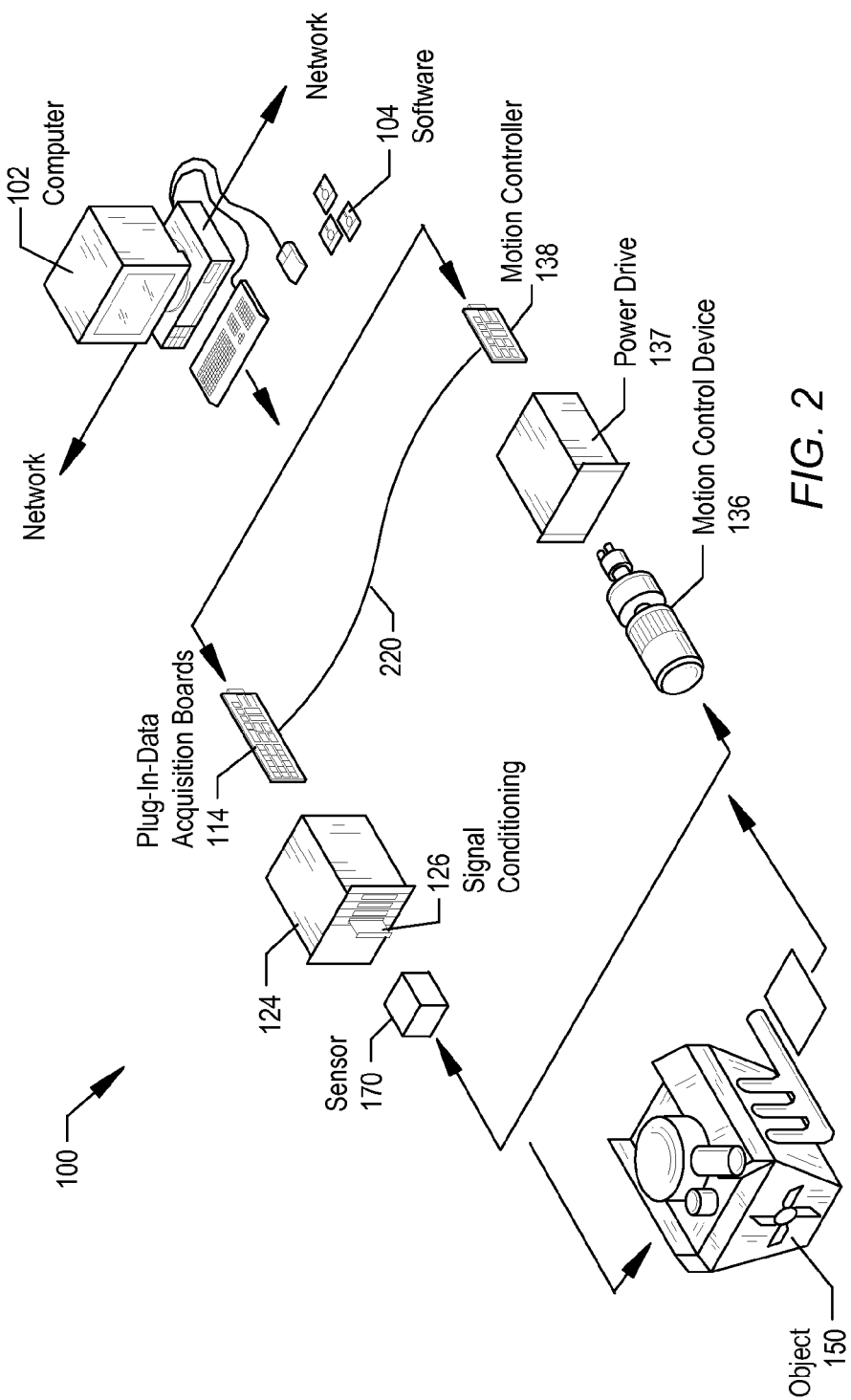
FIG. 2 illustrates an example of a motion control system according to one embodiment.

FIG. 2—Exemplary Motion Control System for Scanning an Object

FIG. 2 illustrates an example motion control system of FIG. 1, wherein the system includes motion control interface device 138 and a data acquisition device 114. The motion control interface device 138 may be coupled to move a sensor 170 to scan an object. The sensor 170 may be operable to acquire measurements of the object 150 being scanned. The data acquisition device 114 may be coupled to the sensor 170 to acquire data or measurements from the sensor 170.

As shown, the motion control interface device 138 may be directly coupled with the measurement device through a dedicated channel to provide real time triggering and/or communication between the motion control interface device 138 and the data acquisition device 114. The computer 102 may operate to receive and integrate or correlate the position data and measurements received from the motion control interface card 138 and data acquisition device 114, respectively, as described below.

Figure 2A:
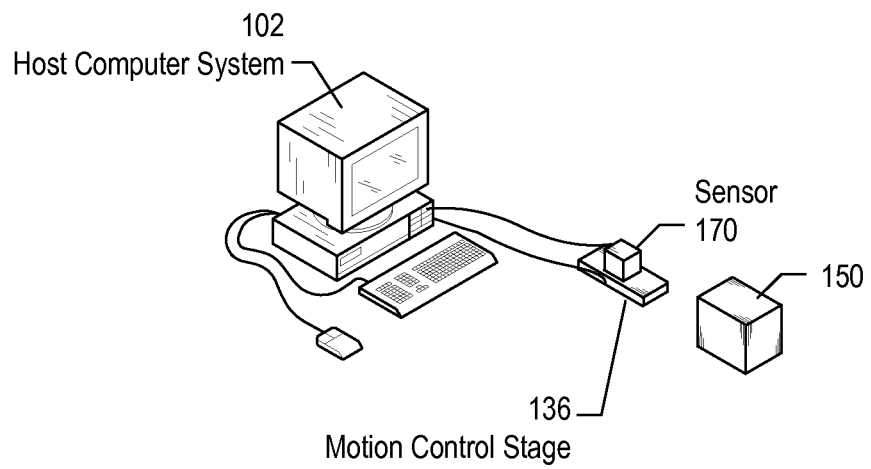
FIG. 2A illustrates an example of a motion control system having a motion control interface device and a data acquisition device comprised within a computer system according to one embodiment.

FIG. 2A illustrates an example motion control system wherein the motion control interface device 138 and data acquisition (or measurement) device 114 (not shown in FIG. 2A) are comprised in computer system 102. The motion control interface device 138 controls motion control stage 136, which moves sensor 170 relative to the object 150 being scanned. The data acquisition device 114 is operable to acquire data sensed by the sensor 170.

Figure 2B:
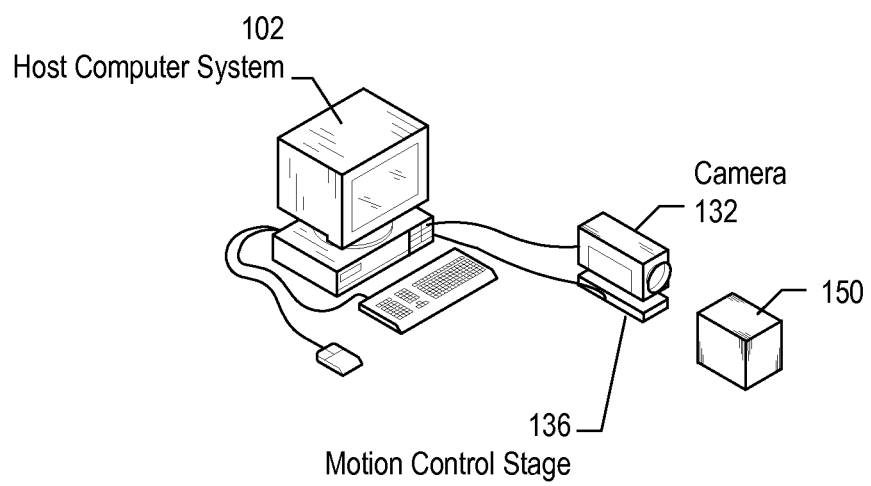
FIG. 2B illustrates an example of a motion control system having a motion control interface device and an image acquisition device comprised within a computer system according to one embodiment.

FIG. 2B illustrates an example motion control system wherein the motion control interface device 138 and image acquisition (or measurement) device 134 (not shown in FIG. 2B) are comprised in computer system 102. The motion control interface device 138 controls motion control stage 136, which moves camera 132 relative to the object 150 being scanned. Here the camera 132 is simply one example of a sensor 170. The image acquisition device 134 is operable to acquire data sensed by the camera 132.

Figure 3:
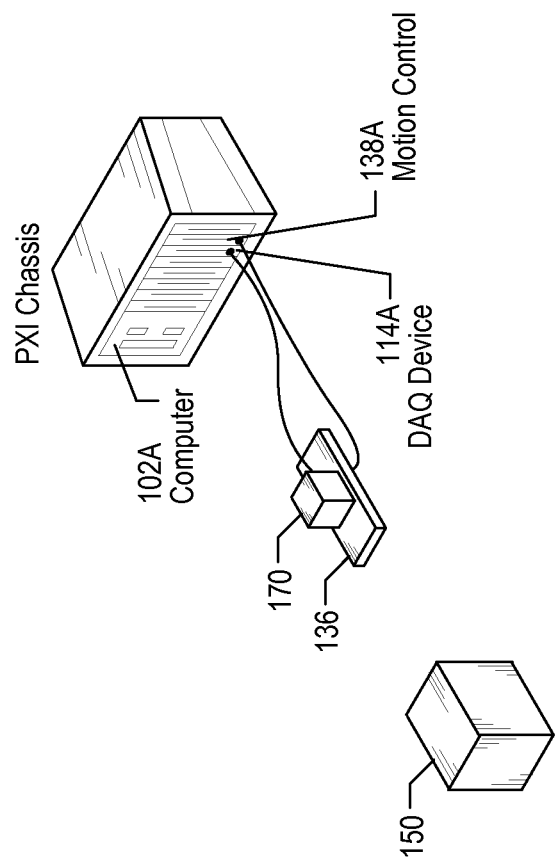
FIG. 3 illustrates an example of a motion control system having a PXI chassis including a computer card, motion control interface card, and measurement device according to one embodiment.

FIG. 3—Exemplary PXI-Based Motion Control System

FIG. 3 illustrates an example motion control system of FIG. 1, wherein the system includes a PXI chassis 118 comprising a computer card 102A, motion control interface card 138A and a measurement device, such as data acquisition device 114A. The motion control interface card 138A is similar to the motion control interface card 138, except that the motion control interface card 138A is in a PXI card form factor. Similarly, the data acquisition device 114A is similar to the data acquisition device 114, except that the data acquisition device 114A is in a PXI card form factor.

As described above with respect to FIG. 2, the motion control interface device 138A may be coupled to move a sensor 170 to scan an object. The sensor 170 may be operable to acquire measurements of the object 150 being scanned. The data acquisition device 114A may be coupled to the sensor 170 to acquire data or measurements from the sensor 170.

In this embodiment, the motion control interface device 138 is directly coupled with the measurement device through dedicated trigger and/or communication lines provided in the PXI backplane. Thus the PXI backplane provides real time triggering and/or communication between the motion control interface device 138A and the data acquisition device 114A.

Figure 4:
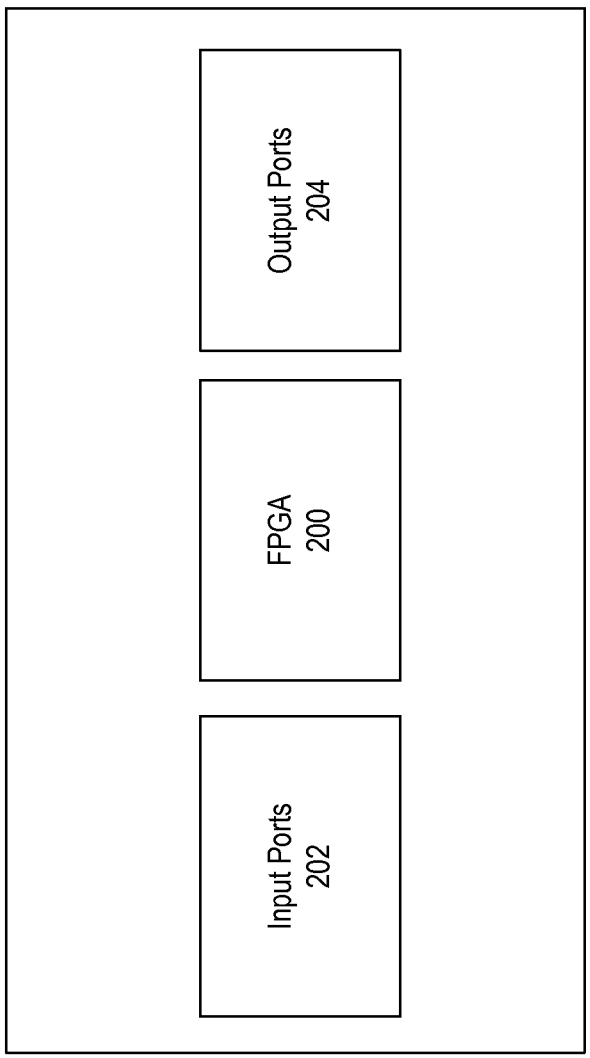
FIG. 4 illustrates one embodiment of a motion control interface device used in a motion control system.

FIG. 4—Motion Control Interface Device

FIG. 4 illustrates the motion control interface device 138 in more detail, according to one embodiment. The motion control interface device 138 includes one or more input ports 202 for receiving input from the host computer system 102. The host computer system 102 may execute a trajectory generation program that generates a trajectory and informs the motion control interface device 138 of each position in the trajectory via the input port 202. The trajectory positions may be received by the motion control interface device 138 at a constant rate, e.g., such that a new position is received every 5 ms for example, or at any other desired rate. The FPGA 200 in the motion control interface device 138 is configured to perform an algorithm to generate step pulses and control the motion device 136 to perform the step pulses by sending control signals via the one or more output ports 204. The step pulses are generated so as to cause the motion device 136 to move through the trajectory points specified by the trajectory generation program executing on the host computer system 102.

Step Generation Algorithm

Previous step generation algorithms have required a processor to be used in the step generation because the algorithms were too computationally complex to be performed by an FPGA alone. It may be desirable to eliminate the need for a processor in order to reduce the cost of the motion control application by requiring only a low resource FPGA for the step generation algorithm. The step generation algorithm described herein can be performed entirely on the FPGA 200 of the motion control interface device 138 so that no processor is needed to generate the step pulses. For example, in some embodiments the motion control interface device 138 may not have a processor such as a CPU (central processing unit), or DSP (digital signal processor). Moreover, the step generation algorithm operates to precisely generate the step pulses to achieve smooth control of the motion device 136.

The step pulse generation algorithm described herein may be performed during each clock tick of the FPGA 200 and is computationally simple enough to be completed during each clock tick. The algorithm works by keeping track of the position of the motion device 136. As the position crosses certain threshold boundaries, the algorithm causes the motion control interface device 138 to send control signals to the motion device 136.

Figure 5:
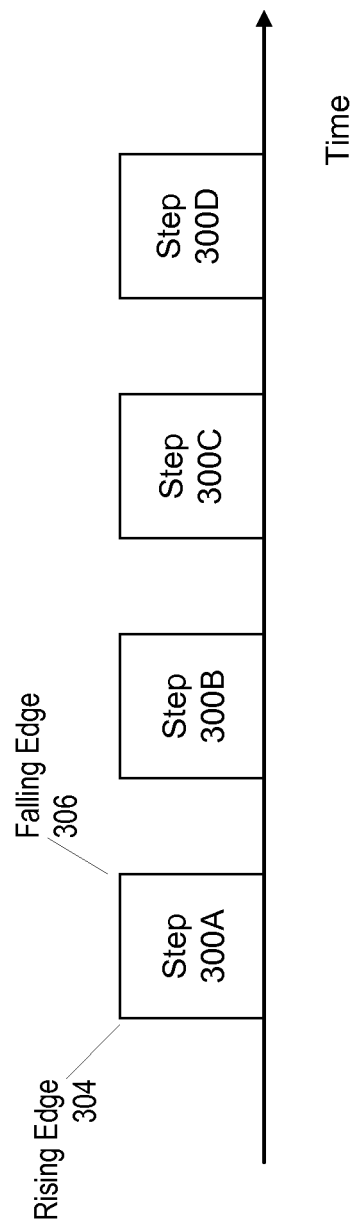
FIG. 5 illustrates steps generated by a step generation algorithm disclosed herein.

FIG. 5 illustrates four steps 300A-300D generated over time. To generate the steps the motion control interface device 138 sends True and False signals over a control line which controls the rising edge 304 and falling edge 306 of each step. Setting the signal to True causes the rising edge of a step to begin, and setting it back to False causes the falling edge of the step to occur. In addition to the control line that controls the rising and falling edges of the steps, the motion control interface device 138 also uses another control line to control the direction of the motion device 136. The motion device 136 may move in the forward direction when the direction control line is True, and may change direction to move in the reverse direction when the direction control line becomes False. Thus, toggling the direction line from True to False or vice versa causes the motion device to change directions.

The step generation algorithm determines when the signals indicating the rising/falling edges of the steps and when the signals indicating direction changes should be sent to the motion device 136. However, the signals are not determined based directly on time, but instead are determined from the position of the motion device 136. More particularly, the algorithm operates to keep track of a position fraction based on the position. The position fraction is incremented (or decremented) at each clock tick of the FPGA. The algorithm generates rising edge signals when the position fraction crosses a particular threshold value, referred to herein as the rising edge threshold value. Similarly, the algorithm signals direction changes when the position fraction crosses a threshold referred to herein as the direction change threshold value.

The position fraction represents how far along the motion control device 136 has moved from one whole number position value to another. Suppose for example that the trajectory of the motion control device 136 begins at position 0, and then moves along the motion axis through position 1, position 2, etc. At the position 0, the position fraction is equal to 0. The position fraction is then incremented at each clock tick of the FPGA so that the position fraction tracks the percentage of the move thus far completed to the next whole number position (the position 1 in this case). Thus, for example, when the motion control device is one quarter of the way to the position 1, the position fraction is equal to 0.25, and when the motion control device is halfway to the position 1, the position fraction is equal to 0.5, and so on. When the motion control device reaches the position 1, the position fraction is reset to 0, and is then incremented at each clock tick of the FPGA similarly as described above to reflect the percentage of the move thus far completed to the next whole number position 2.

Each time the position fraction is incremented at each clock tick, the algorithm compares the position fraction to the rising edge threshold value. When the position fraction crosses the rising edge threshold value, the algorithm signals the motion device 136 to perform a step.

Figure 6:
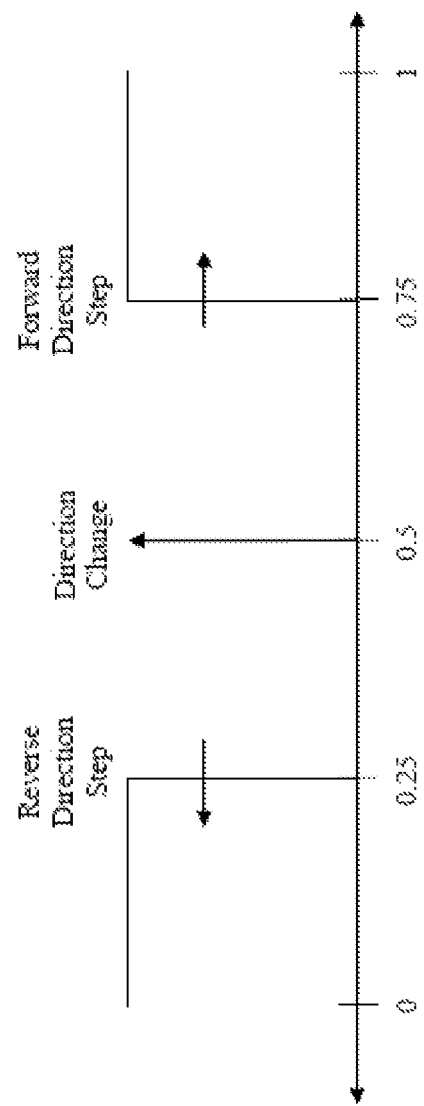
FIG. 6 illustrates step generation and direction change threshold values used by the step generation algorithm.

This is illustrated in FIG. 6. In this example, when moving in the forward direction, the rising edge threshold value is 0.75. Thus, when the position fraction crosses 0.75 in the forward direction the algorithm causes the step control signal to become True to signal the rising edge of a new step in the forward direction to the motion device 136. When moving in the reverse direction, the rising edge threshold value is 0.25. Thus, when the position fraction crosses 0.25 in the reverse direction, the algorithm causes the step control signal to become True to signal the rising edge of a new step in the reverse direction to the motion device 136. After the step control signal becomes True, whether moving in the forward or reverse direction, the signal will remain at True for an amount of time equal to a minimum step pulse length, which may be dependent on the type of motion device 136. For example, the motion device may require the signal to remain at True for the minimum step pulse length time in order to be able to detect the signal change. After the minimum step pulse length, the algorithm sets the step control signal back to False so that it can be ready to signal the next step by again setting the step control signal back to False when the position fraction next crosses the rising edge threshold value.

FIG. 6 also illustrates that the algorithm may send a direction change signal to the motion device 136 in some cases when the position fraction crosses the direction change threshold value, which is 0.5 in this example. Situations that cause a direction change are described in detail below.

It is noted that the values of 0.75 and 0.25 for the forward and reverse rising edge threshold values and the value of 0.5 for the direction change threshold value are given as examples of threshold values, and other values may be used in other embodiments of the algorithm.

Figure 7:
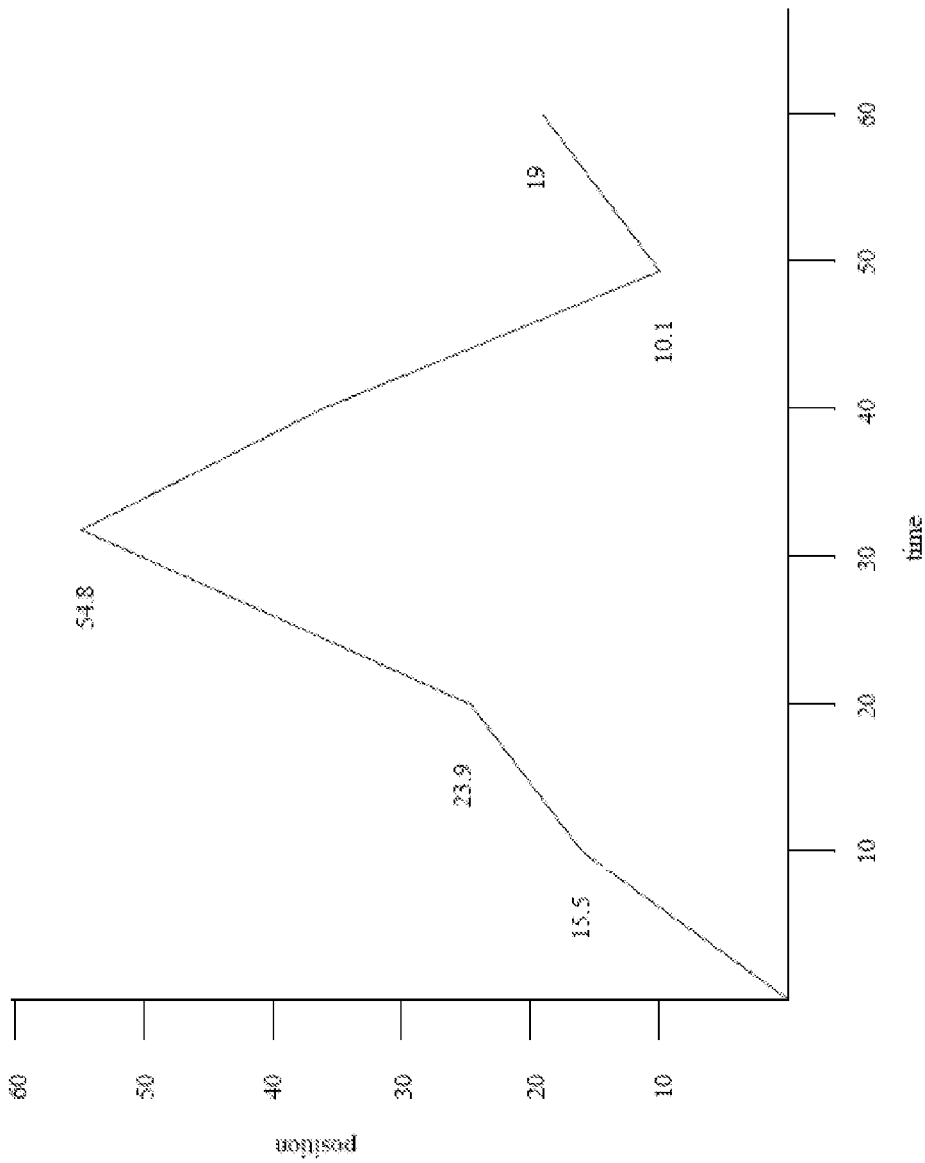
FIG. 7 is a graph illustrating an example trajectory through which a motion device needs to move, where the step generation algorithm operates to generate steps to cause the motion device to move through the trajectory.

FIG. 7 is a graph illustrating an example trajectory through which the motion device 136 needs to move. As described above, the desired trajectory points may be determined by a trajectory generation program and passed as input to the step generation algorithm executing in the FPGA 200 of the motion control interface device 138. In this example, the trajectory generation program passes the motion control interface device 138 a new trajectory point at a 10 ms constant rate in order to inform the motion control interface device 138 that the motion device 136 needs to be at the specified trajectory point at the next 10 ms time point. For example, when starting at Time=0 and Position=0, the trajectory generation program may pass a trajectory position value of 15.5 to the motion control interface device 138 to indicate that the motion device 136 needs to be at position 15.5 when time=10 ms. The step generation algorithm in the FPGA 200 of the motion control interface device 138 may receive the trajectory position value of 15.5 and generate step pulses so as to cause the motion device 136 to move to the position 15.5. When the time=10 ms the trajectory generation program may pass a new trajectory position value of 23.9 to the motion control interface device 138 to indicate that the motion device 136 needs to be at position 23.9 when time=20 ms. The step generation algorithm in the FPGA 200 may receive the trajectory position value of 23.9 and generate step pulses so as to cause the motion device 136 to move to the position 23.9, and so on.

The step generation algorithm generates the step pulses as follows. As the motion device moves from one position point to another, the step generation algorithm keeps track of the position fraction. At each whole number position along the motion axis, the position fraction begins at 0, and gradually increases to 1 until the next whole number position along the motion axis is reached. When the position fraction crosses the rising edge threshold value of 0.75, the step generation algorithm causes the motion control interface device 138 to send a rising edge signal to the motion device 136 to begin a new step. Thus, for example, when moving to the first trajectory point of 15.5 on the motion axis, the motion device 136 will pass 15 whole number position points (position 1, position 2, etc.). Each time the motion device is at 0.75 of the distance to the next position point, a new step is generated. Thus, in the first segment of the trajectory, 15 steps are performed at the respective positions 0.75, 1.75, 2.75, . . . , 13.75, and 14.75.

Similarly, in the second segment of the trajectory, 9 steps are performed at the respective positions 15.75, 16.75, 17.75, . . . , 22.75, and 23.75. Each of these positions is where the position fraction crosses the rising edge threshold value of 0.75.

Similarly, in the third segment of the trajectory, 31 steps are performed at the respective positions 24.75, 25.75, 26.75, . . . , 53.75, and 54.75, corresponding to where the position fraction crosses the rising edge threshold value of 0.75. Thus, the last step begins as usual at the 54.75 mark. However, the next trajectory position value received at the time=30 ms is 10.1, which is back in the other direction, thus indicating that a direction change is needed. Thus, a direction change is needed at the beginning of the fourth segment in order to undo the step that was started at the position 54.75. The position fraction then begins moving in the reverse direction, e.g., toward 0. When the position fraction crosses the direction change threshold value of 0.5 (i.e., when the motion control device 136 is at position 54.5), the direction control line signal is set back to False. Since the motion control device 136 is now moving in the reverse direction, the relevant rising edge threshold is 0.25 instead of 0.75. Thus, a new step is performed at position 54.25, which corresponds to where the position fraction crosses the rising edge threshold of 0.25. The algorithm continues generating steps in the reverse direction each time the position fraction crosses the 0.25 threshold, e.g., so that steps are generated at the positions 53.25, 52.25, 51.25, . . . , 11.23, and 10.25.

At the beginning of the fifth segment, another direction change is needed, this time towards the forward direction. The rising edge threshold value again becomes 0.75, and the first step in the forward direction occurs at position 10.75.

Figure 8:
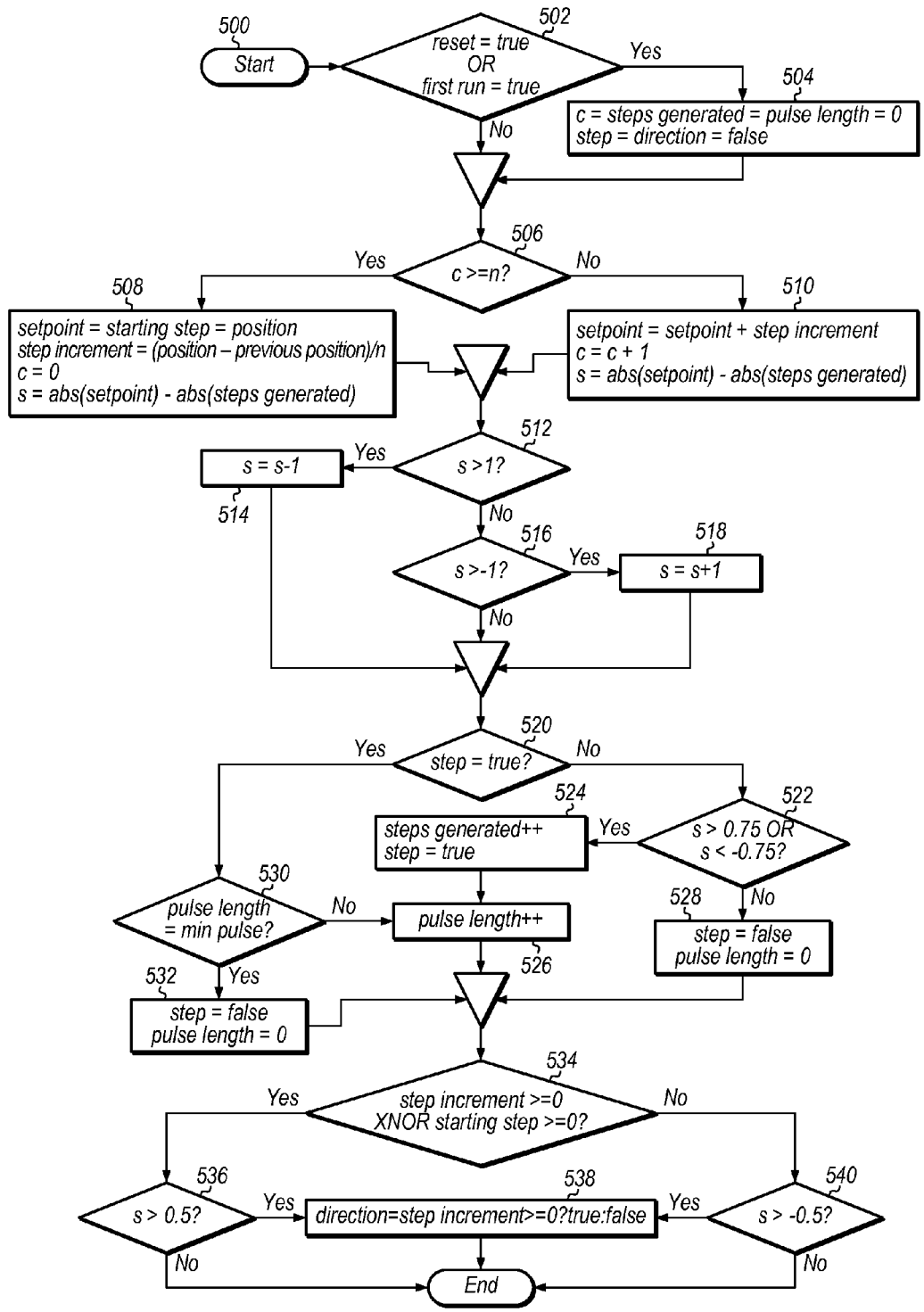
FIG. 8 is a flowchart illustrating one embodiment of the step generation algorithm.

FIG. 8 is a flowchart illustrating one embodiment of the step generation algorithm. The FPGA 200 of the motion control interface device 138 may be configured with logic that implements the algorithm. One cycle of the algorithm may be performed during each clock cycle of the FPGA 200.

The operation of the algorithm begins at the Start block 500. At the decision block 502, the FPGA logic that implements the algorithm operates to determine whether the "reset" or "first run" Boolean variables are True. These variables are given as input to the algorithm, and if True they signify that other variables used in the algorithm need to be initialized. The initialization occurs at block 504. Here the FPGA logic sets the variables "c", "steps generated", and "pulse length" to 0. The "c" variable is a counter that counts from 0 to "n", where "n" is the number of FPGA cycles per position update. As discussed above, a trajectory generation program may pass position updates to the motion control interface device 138 at a constant rate. Thus, the value of "n" depends on the rate at which the position updates are received from the trajectory generation program and the clock rate of the FPGA 200. The "steps generated" variable that is initialized at block 504 represents the number of steps generated since the last trajectory position update was received from the trajectory generation program. The "pulse length" variable is described below. At the initialization block 504 the FPGA logic also sets the "step" and "direction" Boolean variables to False. These variables are described below.

At the decision block 506 the FPGA logic checks whether the counter "c" is greater than or equal to "n". If so then at block 508 the "setpoint" and "starting step" variables are set to the same value as the "position" variable, where "position" is the most recent trajectory position value received from the trajectory generation program. Also at block 508 the "step increment" variable is set to the value ("position"–"previous position")/"n", where "position" and "n" are as described above, and "previous position" is the previous trajectory position value received from the trajectory generation program. Also at block 508 the counter "c" is set to 0, and the variable "s" is set to the absolute value of the "setpoint" variable minus the absolute value of the "steps generated" variable. The "s" variable is the position fraction that is compared to the rising edge threshold value and the direction change threshold value in order to determine when the signal the rising edge of a new step and when to change direction.

Referring again to block 506, if "c" is less than "n" then the algorithm proceeds to block 510 instead of block 508. At block 510 the FPGA logic sets "steppoint" to a new value which is equal to its current value plus the value of the "step increment" variable. The FPGA logic also increments the "c" counter by "1" and sets the variable "s" to the absolute value of "setpoint" minus the absolute value of "steps generated".

From block 508 or block 510 the algorithm proceeds to the logic shown at blocks 512, 514, 516, and 518. Here the FPGA logic subtracts 1 from "s" if "s" is greater than "1", or adds 1 to "s" if "s" is less than −1. This accounts for floating point overflow situations and serves the ensure that "s" is a fraction between 0 and 1.

The algorithm then proceeds to block 520, which is where the FPGA logic checks whether the Boolean "step" variable is currently set to True. As noted above at block 504 the "step" variable is initially set to False. When it is False the algorithm logic proceeds to block 522. At block 522 the FPGA logic checks whether the position fraction "s" is greater than 0.75 (which is the rising edge threshold value for the forward direction in this embodiment of the algorithm), or less than −0.75 (which is the rising edge threshold value for the negative direction in this embodiment of the algorithm). If so then this means that the position fraction has crossed a threshold boundary signifying that a new step needs to be performed, and thus the FPGA logic may set the step control signal line for the motion control device 136 to True, which causes the motion control device 136 to perform a new step. As shown at block 524, the FPGA logic sets the "step" variable to True to indicate that the control signal line has been set to True, and also increments the "steps generated" variable by 1 to indicate that another step has been generated. Then at block 526 the FPGA logic increments the "pulse length" variable by 1.

Otherwise, if the FPGA logic at block 522 determines that the position fraction has not yet crossed the rising edge threshold boundary then at block 528 the FPGA logic sets the "step" variable to False and sets the "pulse length" variable to 0.

Referring again to block 520, if the "step" variable was already True at this block then the algorithm proceeds to block 530, where the FPGA logic checks whether the "pulse length" variable is equal to "min pulse". As discussed above, the motion control device 136 may require that the step control signal line remain set at True for a minimum amount of time so that the rising edge of the step can be detected. The "min pulse" variable represents the number of FPGA clock ticks that need to elapse to meet this requirement. If "pulse length" is equal to "min pulse" then at block 532 the FPGA logic turns the step control signal line for the motion control device 136 back to False and sets the "step" variable back to False, thus representing that the falling edge of the step has occurred. Otherwise if the "pulse length" variable has not yet reached the "min pulse" value then the "pulse length" variable is incremented at block 526.

From block 526, 528, or 532, the algorithm proceeds to the decision block 534. Here the FPGA logic checks whether the "step increment" variable is greater than or equal to 0, and the "starting step" variable is greater than or equal to 0, using the XNOR function, which is an inverse exclusive OR comparison. If the XNOR result is True then at block 536 the FPGA logic checks whether the position fraction "s" is greater than 0.5. Otherwise, if the XNOR result at block 534 is False then at block 540 the FPGA logic checks whether the position fraction "s" is less than −0.5. If the comparison at block 536 or 540 evaluates to True then at block 538 the direction control line is toggled to cause the motion device 136 to reverse directions.

Various embodiments may further include receiving or storing instructions and/or data implemented in accordance with the foregoing description upon a memory medium. A memory medium may be any of various types of memory devices or storage devices. The term is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof.

In some embodiments the memory medium may store program instructions executable to automatically configure the FPGA 200 of the motion control interface device 138 to perform the step generation algorithm described above. For example, the program instructions may be executed by a host computer coupled to the motion control interface device 138 to cause the host computer to communicate with the FPGA to program or configure the FPGA with logic to implement the step generation algorithm.

It is noted that the step generation algorithm described above does not directly keep track of time values or directly use time values in determining when to generate a new step of the motion device. The step generation algorithm instead uses position values to determine when new steps should be generated. The use of position values instead of time values may be advantageous since the step generation algorithm described herein requires fewer computational resources than some time-based step generation algorithms known in the prior art, which may for example enable the present step generation algorithm to be performed by an FPGA device without requiring the use of a processor for the step generation.

It is also noted that the step generation algorithm described herein enables the trajectory generation program to pass trajectory positions that are not whole numbers to the motion control interface device 138. For example, as shown in the graph of FIG. 7, the trajectory generation program may pass trajectory position inputs such as 15.5, 23.9, 54.8, etc. to the motion control interface device 138, and the step generation algorithm implemented in the FPGA 200 of the motion control interface device 138 will generate steps to cause smooth motion through the specified trajectory positions.

Although the step generation algorithm is discussed in terms of a single motion axis, it is noted that the step generation algorithm may also be extended to motion control systems that use multiple axes, e.g., to control motion in two dimensions or three dimensions. The steps for each axis may be independently generated using a respective position fraction as described above.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. A motion control system comprising:
   a motion control device; and
   a motion control interface device, wherein the motion control interface device includes an FPGA (Field-programmable Gate Array), wherein the FPGA, independent of processors, is configured to implement a step generation algorithm for controlling the motion control device, wherein the FPGA is configured to:
   determine a fraction value representing a position of the motion control device;
   compare the fraction value to a first threshold value;
   cause the motion control device to perform a step if the fraction value has crossed the first threshold value;

compare the fraction value to a second threshold value; and cause the motion control device to change direction along a motion axis if the fraction value has crossed the second threshold value.

2. The motion control system of claim 1, wherein the step generation algorithm implemented by the FPGA does not directly use time values to determine when to cause the motion control device to perform a step.

3. The motion control system of claim 1, wherein the FPGA includes a clock, and wherein the FPGA is configured to perform a respective cycle of the step generation algorithm during each clock cycle of the FPGA.

4. The motion control system of claim 1, wherein the fraction value represents a percentage the motion control device has moved from one whole number position to another whole number position along a motion axis.

5. The motion control system of claim 1, wherein the FPGA is configured to calculate a step increment and use the step increment in determining the fraction value that represents the position of the motion control device.

6. The motion control system of claim 1, The motion control system of claim 1, wherein the FPGA is further configured to:

determine a minimum step pulse length, wherein the minimum step pulse length represents a number of clock cycles of the FPGA; and after causing the motion control device to perform a step, signal the motion control device to cause a falling edge for the step after the minimum step pulse length number of clock cycles of the FPGA have occurred.

7. A method comprising:
configuring an FPGA (Field-programmable Gate Array) of a motion control interface device to perform a step generation algorithm for controlling a motion control device without utilizing another processor, wherein the step generation algorithm operates to:

determine a fraction value representing a position of the motion control device;

compare the fraction value to a first threshold value;

cause the motion control device to perform a step if the fraction value has crossed the first threshold value;

compare the fraction value to a second threshold value; and cause the motion control device to change direction along a motion axis if the fraction value has crossed the second threshold value.

8. The method of claim 7, wherein the step generation algorithm implemented by the FPGA does not directly use time values to determine when to cause the motion control device to perform a step.

9. The method of claim 7, wherein the FPGA includes a clock, and wherein the FPGA is configured to perform a respective cycle of the step generation algorithm during each clock cycle of the FPGA.

10. The method of claim 7, wherein the fraction value represents a percentage the motion control device has moved from one whole number position to another whole number position along a motion axis.

11. The method of claim 7, wherein the FPGA is configured to calculate a step increment and use the step increment in determining the fraction value that represents the position of the motion control device.

12. The method of claim 7, wherein the step generation algorithm further operates to:

determine a minimum step pulse length, wherein the minimum step pulse length represents a number of clock cycles of the FPGA; and after causing the motion control device to perform a step, signal the motion control device to cause a falling edge for the step after the minimum step pulse length number of clock cycles of the FPGA have occurred.

13. A non-transitory computer-readable memory medium storing program instructions executable by a computer system to cause the computer system to:

configure an FPGA (Field-programmable Gate Array) of a motion control interface device to perform a step generation algorithm for controlling a motion control device independent of processors, wherein the step generation algorithm operates to:

determine a fraction value representing a position of the motion control device;

compare the fraction value to a first threshold value;

cause the motion control device to perform a step if the fraction value has crossed the first threshold value;

compare the fraction value to a second threshold value; and cause the motion control device to change direction along a motion axis if the fraction value has crossed the second threshold value.

14. The non-transitory computer-readable memory medium of claim 13, wherein the step generation algorithm implemented by the FPGA does not directly use time values to determine when to cause the motion control device to perform a step.

15. The non-transitory computer-readable memory medium of claim 13, wherein the FPGA includes a clock, and wherein the FPGA is configured to perform a respective cycle of the step generation algorithm during each clock cycle of the FPGA.

16. The non-transitory computer-readable memory medium of claim 13, wherein the fraction value represents a percentage the motion control device has moved from one whole number position to another whole number position along a motion axis.

17. The non-transitory computer-readable memory medium of claim 13, wherein the program instructions are further executable by the computer system to:

configure the FPGA to calculate a step increment and use the step increment in determining the fraction value that represents the position of the motion control device.

18. The non-transitory computer-readable memory medium of claim 13, wherein the step generation algorithm further operates to:

determine a minimum step pulse length, wherein the minimum step pulse length represents a number of clock cycles of the FPGA; and after causing the motion control device to perform a step, signal the motion control device to cause a falling edge for the step after the minimum step pulse length number of clock cycles of the FPGA have occurred.

* * * * *

UNITED STATES PATENT AND TRADEMARK OFFICE
CERTIFICATE OF CORRECTION

PATENT NO. : 8,788,099 B2
APPLICATION NO. : 13/194222
DATED : July 22, 2014
INVENTOR(S) : Sreekantham It is certified that error appears in the above-identified patent and that said Letters Patent is hereby corrected as shown below:

In the Claims:

Claims 6, Column 11, lines 27-28 please delete "The motion control system of claim 1, The motion control system of claim 1," and substitute -- The motion control system of claim 1, --.

Signed and Sealed this
Seventh Day of October, 2014

Michelle K. Lee
*Deputy Director of the United States Patent and Trademark Office*